(12) United States Patent
Iyer et al.

(10) Patent No.: US 11,240,525 B2
(45) Date of Patent: Feb. 1, 2022

(54) SYSTEMS AND METHODS FOR VIDEO ENCODING ACCELERATION IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 16/183,843

(22) Filed: Nov. 8, 2018

(65) Prior Publication Data

US 2020/0154131 A1 May 14, 2020

(51) Int. Cl.
*H04N 19/517* (2014.01)
*H04N 5/33* (2006.01)
*H04N 19/124* (2014.01)
*G02B 27/01* (2006.01)
*H04N 19/597* (2014.01)

(52) U.S. Cl.
CPC ....... *H04N 19/517* (2014.11); *G02B 27/0172* (2013.01); *H04N 5/33* (2013.01); *H04N 19/124* (2014.11); *H04N 19/597* (2014.11); *G02B 2027/014* (2013.01); *G02B 2027/0138* (2013.01)

(58) Field of Classification Search
CPC ........ G06F 3/011; G06F 3/0346; G06F 3/017; G06F 3/013; G06F 3/012; G06F 3/04815; G06T 19/006; G02B 27/017; G02B 2027/014; G02B 2027/0138; G02B 2027/0187; G02B 27/0093
See application file for complete search history.

(56) References Cited

U.S. PATENT DOCUMENTS

| | | | |
|---|---|---|---|
| 2018/0164593 A1* | 6/2018 | Van Der Auwera | G06T 3/0031 |
| 2018/0292743 A1* | 10/2018 | Baran | H04N 13/161 |
| 2019/0213792 A1* | 7/2019 | Jakubzak | G02B 27/017 |

OTHER PUBLICATIONS

Displaylink, "Wireless VR," 2018, 5 pages, retrieved Aug. 30, 2018, available at http://www.displaylink.com/vr.
(Continued)

*Primary Examiner* — Farhan Mahmud
(74) *Attorney, Agent, or Firm* — Fogarty LLP

(57) ABSTRACT

Embodiments of systems and methods for video encoding acceleration in virtual, augmented, and mixed reality (xR) applications are described. In an illustrative, non-limiting embodiment, an Information Handling System (IHS) may include a processor; and a memory coupled to the processor, the memory having program instructions stored thereon that, upon execution by the processor, cause the IHS to: receive sensor data from a Head-Mounted Device (HMD) wearable by a user during execution of an xR application, where the sensor data indicates movement of the HMD; modify the sensor data into a motion hint; and provide the motion hint to a video encoder, where the video encoder is configured to use the motion hint to accelerate encoding of video transmitted by the IHS to the HMD during execution of the xR application.

20 Claims, 5 Drawing Sheets

(56) References Cited

OTHER PUBLICATIONS

Steven Lynch, "AMD Acquires Nitero, Maker of 60GHz Wireless Chips For VR/AR Headsets," Apr. 10, 2017, 10 pages, retrieved Aug. 30, 2018, available at https://www.tomshardware.com/news/amd-acquires-nitero-wireless-vr,34106.html.

TPCast "Unleash the VR World," 2 pages, retrieved Aug. 30, 2018, available at https://www.tpcastvr.com/.

Muhammad Shahid, "On Computational Complexity of Motion Estimation Algorithms in MPEG-4 Encoder," 2010, 66 pages, retrieved Aug. 30, 2018, available at http://www.diva-portal.org/smash/get/diva2:830400/FULLTEXT01.pdf (Chapter 4).

Patel et al., "Review and Comparative Study of Motion Estimation Techniques to Reduce Complexity in Video Compression," Aug. 2013, 11 pages, International Journal of Advanced Research in Electrical, Electronics and Instrumentation Engineering, vol. 2, retrieved Aug. 30, 2018, available at https://pdfs.semanticscholar.org/f477/95c4f2d4f8fff1d66d114865042638d2480b.pdf.

Santamaria et al., "A Comparison of Block-Matching Motion Estimation Algorithms," Oct. 4, 2012, 8 pages, retrieved Aug. 30, 2018, available at https://www.slideshare.net/mmv-lab-univalle/slides7-ccc-v8.

Nvidia, "NvMediaEncodeInitializeParamsH265 Struct Reference," 2 pages, retrieved Aug. 30, 2018, available at https://docs.nvidia.com/drive/nvvib_docs/NVIDIA%20DRIVE%20Linux%20SDK%20Development%20Guide/baggage/structNvMediaEncodeInitializeParamsH265.html (see enable ExternalMEHints).

Riisgaard et al., "SLAM for Dummies", retrieved Aug. 30, 2018, 127 pages, Extended KalmanFilters for SLAM, available at https://ocw.mit.edu/courses/aeronautics-and-astronautics/16-412j-cognitive-robotics-spring-2005/projects/1aslam_blas_repo.pdf.

Occipital, "Structured Core," 6 pages, retrieved Aug. 30, 2018, available at https://structure.io/core.

* cited by examiner

SYSTEMS AND METHODS FOR VIDEO ENCODING ACCELERATION IN VIRTUAL, AUGMENTED, AND MIXED REALITY (XR) APPLICATIONS

FIELD

The present disclosure generally relates to Information Handling Systems (IHSs), and, more particularly, to systems and methods for video encoding acceleration in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for video encoding acceleration in virtual, augmented, and mixed reality (xR) applications are described. In an illustrative, non-limiting embodiment, an Information Handling System (IHS) may include a processor; and a memory coupled to the processor, the memory having program instructions stored thereon that, upon execution by the processor, cause the IHS to: receive sensor data from a Head-Mounted Device (HMD) wearable by a user during execution of an xR application, where the sensor data indicates movement of the HMD; modify the sensor data into a motion hint; and provide the motion hint to a video encoder, where the video encoder is configured to use the motion hint to accelerate encoding of video transmitted by the IHS to the HMD during execution of the xR application.

In some cases, the sensor data may include: a first frame obtained by a Simultaneous Localization and Mapping (SLAM) camera mounted on the HMD; and a second frame obtained by the SLAM camera following the first frame. The first and second frames may include infra-red (IR) or near IR (NIR) camera frames. Additionally, or alternatively, the sensor data may include first sensor data obtained concurrently with the capture of a first frame by a SLAM camera mounted on the HMD; and second sensor data obtained concurrently with capture of a second frame by the SLAM camera following the first frame. For example, the sensor data may comprise at least one of: angular velocity data or accelerometer data, obtained from an Inertial Measurement Unit (IMU) mounted on the HMD.

To modify the sensor data into the motion hint, the program instructions, in response to execution by the processor, may cause the IHS to: extract a first camera transform matrix from the first frame; extract a second camera transform matrix from the second frame; and calculate a motion matrix as a difference between the second and first camera transform matrices. The program instructions, in response to execution by the processor, may also cause the IHS to map the motion matrix into a first differential motion matrix and a second differential motion matrix.

The program instructions, in response to execution by the processor, may further cause the IHS to quantize at least a portion of the motion matrix into a motion vector format. For example, the motion vector format may include a range and an increment. The program instructions, in response to execution by the processor, may cause the IHS to: provide at least a portion of the quantized portion of the motion matrix to the video encoder using an Application Programming Interface (API). For instance, the motion hint may include one or more motion vectors usable by the video encoder as candidate motion vectors during a motion estimation process. The motion estimation process further comprises an inter-frame or intra-frame coding.

In another illustrative, non-limiting embodiment, a method may include: receiving, by an IHS, image frames captured by a camera mounted on an HMD worn by a user and wirelessly coupled to the IHS during execution of an xR application; derive a motion hint from the image frames; and provide the motion hint to a video encoder, wherein the video encoder is configured to use the motion hint to accelerate encoding of video wirelessly transmitted by the IHS to the HMD during execution of the xR application.

The image frames may include IR or NIR camera frames. Deriving the motion hint may also include: extracting a first camera transform matrix from a first frame; extracting a second camera transform matrix from a second frame; and calculating a motion matrix as a difference between the second and first camera transform matrices. The method may also include mapping the motion matrix into a left motion matrix and a right motion matrix, quantizing the motion matrix into a motion vector format, and/or providing at least a portion of the quantized motion matrix to the video encoder via an API.

In yet another illustrative, non-limiting embodiment, a hardware memory of an HMD wearable by a user, may include program instructions stored thereon that, upon execution by a processor, cause the HMD to: transmit, to an IHS, frames captured by a camera mounted on the HMD, where the frames are usable by the IHS to perform SLAM of the HMD during execution of an xR application; and receive video compressed by the IHS, at least in part, using a motion hint determined based upon the frames. The motion hint may include a motion vector usable by the IHS as a candidate motion vector in a motion estimation process.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

To facilitate explanation of the various systems and methods discussed herein, the following description has been split into sections. It should be noted, however, that any sections, headings, and subheadings used herein are for organizational purposes only, and are not meant to limit or otherwise modify the scope of the description nor the claims.

Overview

Embodiments described herein provide systems and methods for video encoding acceleration in virtual, augmented, and mixed reality (xR) applications. These techniques are particularly useful in xR applications that employ Head-Mounted Devices (HMDs), Heads-Up Displays (HUDs), and eyeglasses—collectively referred to as "HMDs."

Figure 1:
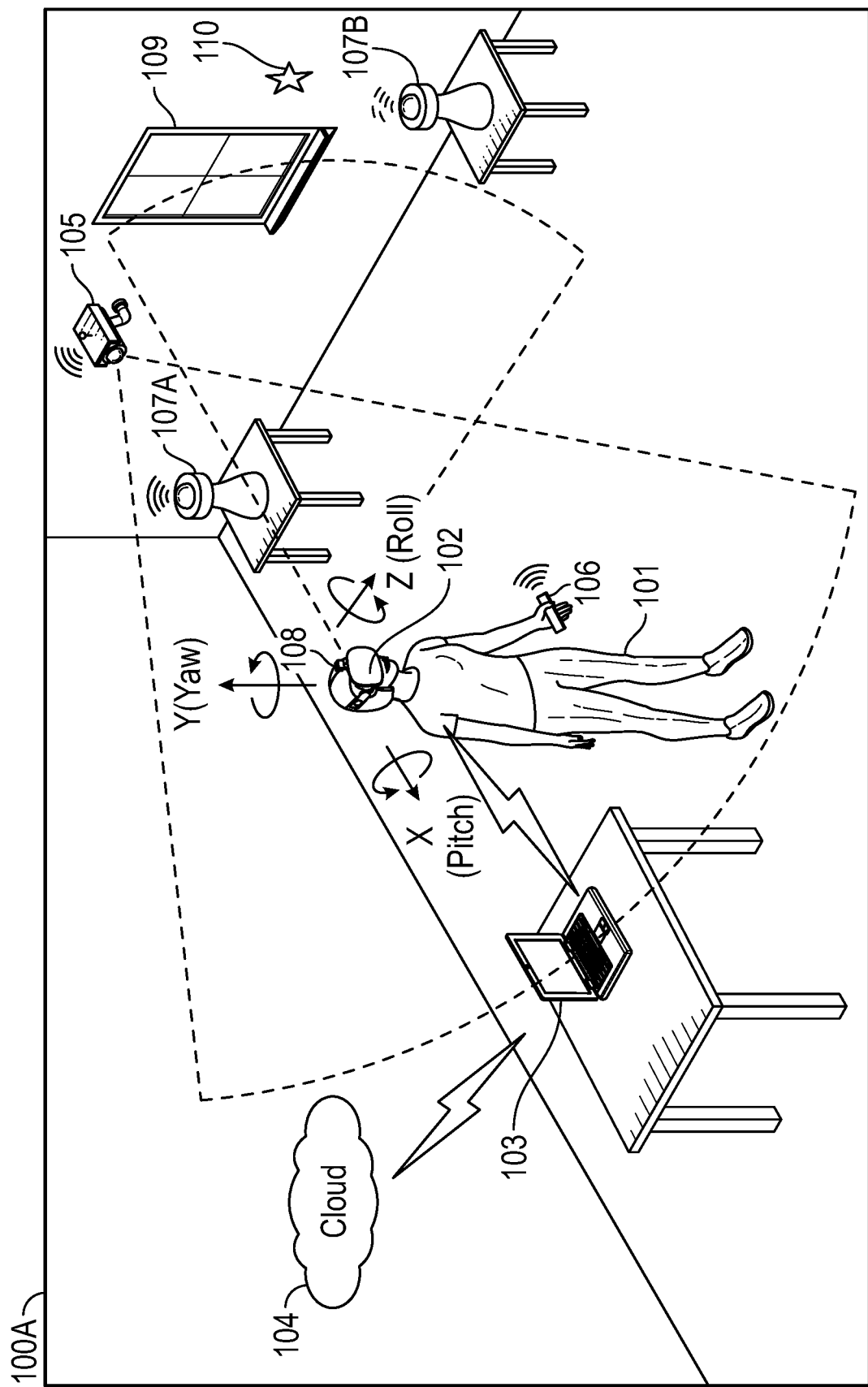
FIG. 1 illustrates an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Figure 2:
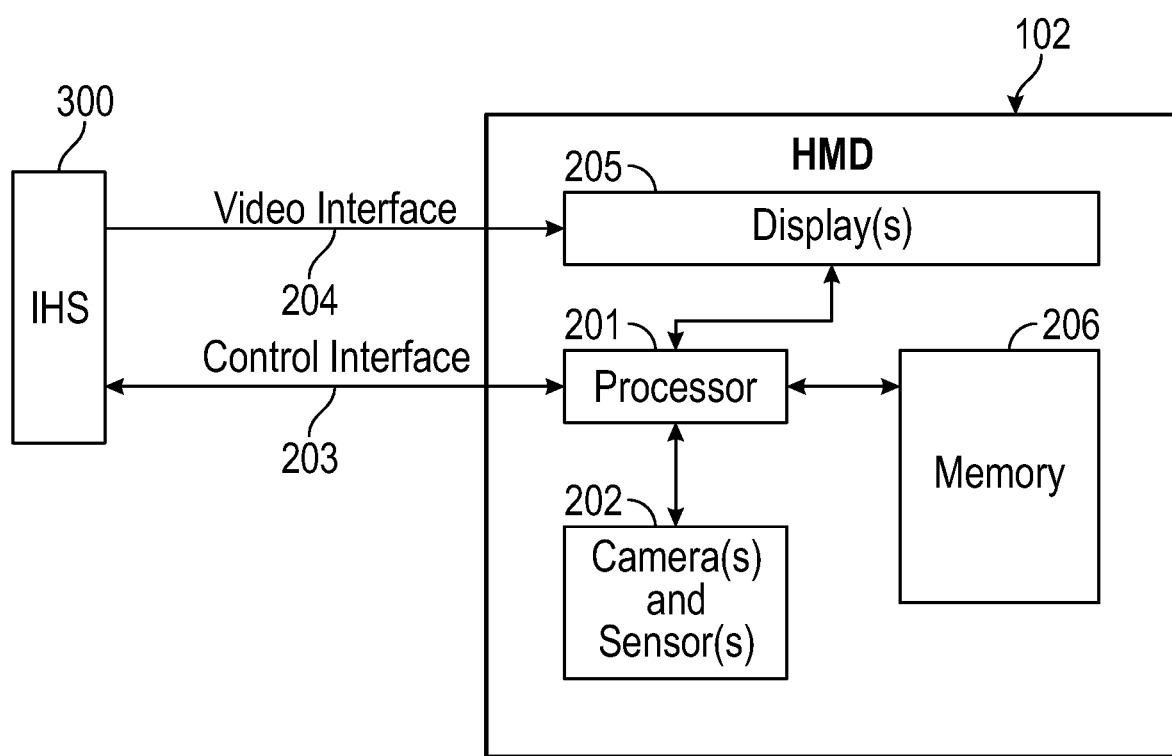
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out cameras, outside-in cameras, eye tracking cameras, RGB cameras, gesture cameras, infrared (IR) or near-IR (NIR) cameras, SLAM cameras, etc. Meanwhile, examples of sensor(s) 202 include, but are not limited to: electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide forward and backward communication channels between processor 201 and IHS 300, depending upon the architecture of the xR system, to facilitate execution of an xR application. For example, program instructions stored in memory 206, when executed by processor 201, may cause frames captured by camera(s) 202 to be transmitted to IHS 300 via control interface 203.

IHS 300 may in turn execute SLAM module 403 (FIG. 4), for example, based upon landmarks found in the video frames received from HMD 102's camera(s) 108 (or from outside-in camera 105). Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to display(s) 205 via video interface 204 (e.g., HDMI, DVI, DISPLAYPORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
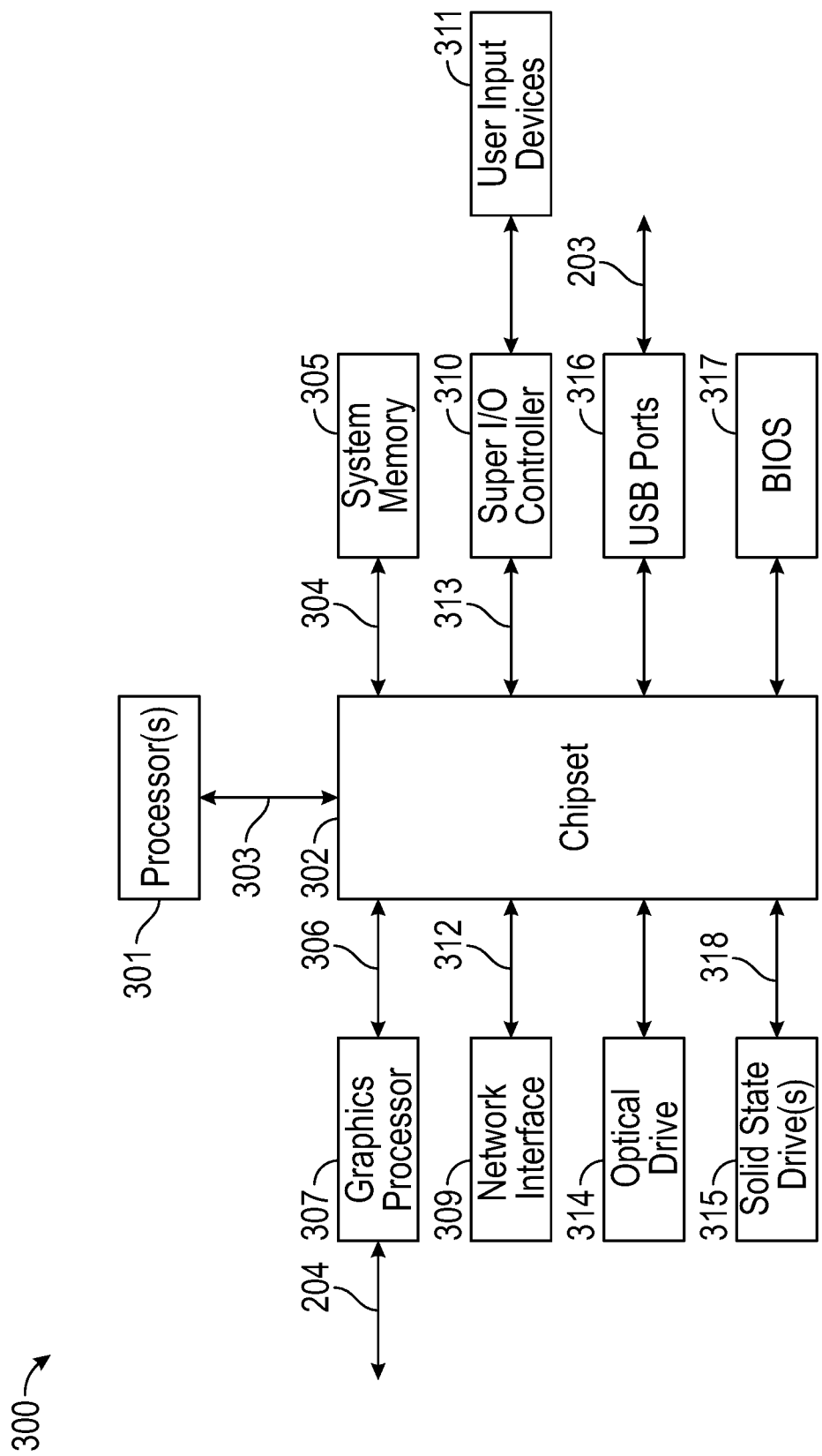
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204 (e.g., HDMI, DVI, DISPLAYPORT, etc.).

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 300 through the chipset 302. In certain embodiments, chipset 302 may be coupled to a network interface 309, such as provided by a Network Interface Controller (NIC) that is coupled to IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to IHS 300, or may be located remotely from IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to IHS 300 and to load an operating system for use by IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
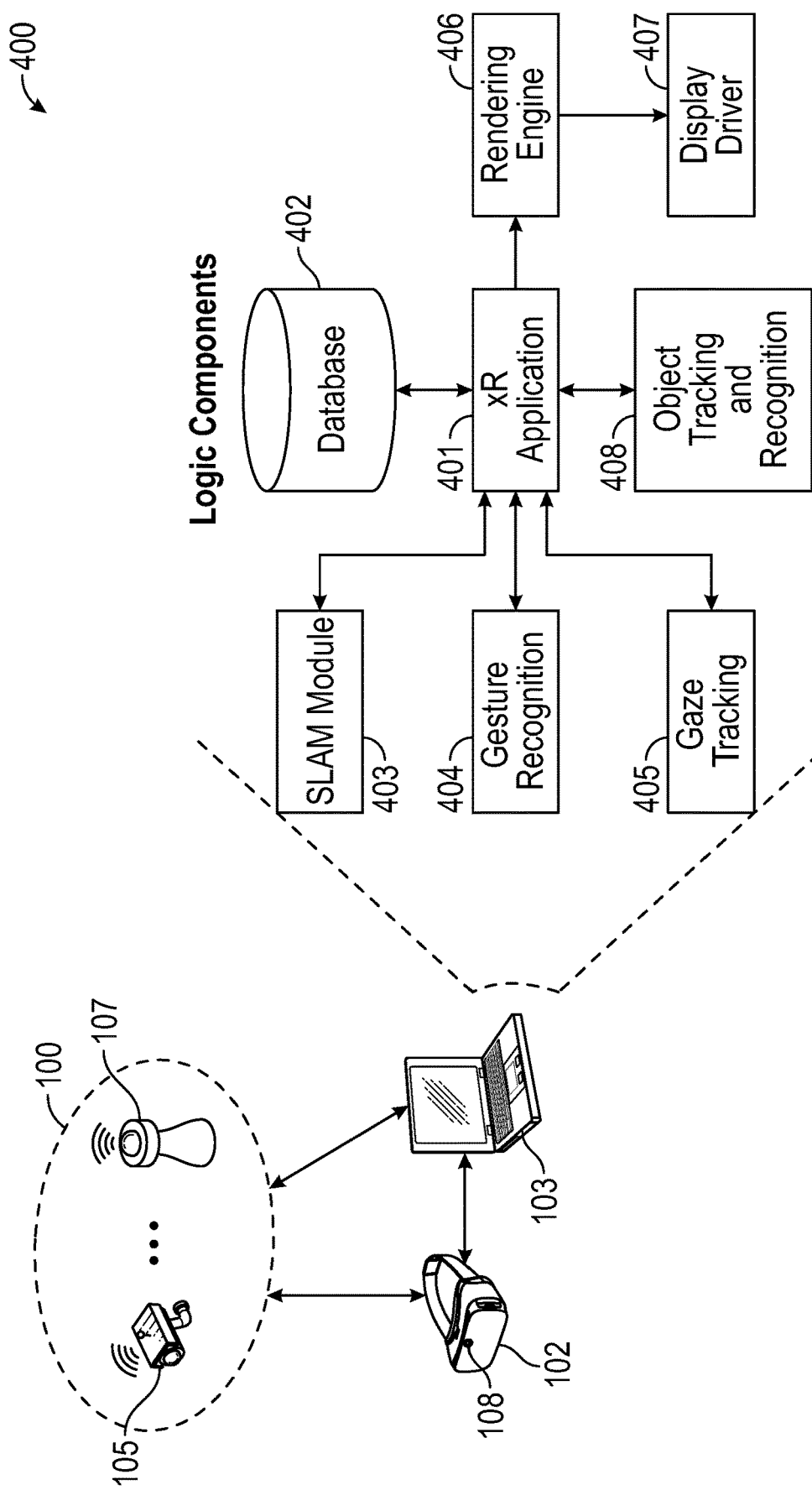
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc.

SLAM module 403 uses positional tracking devices among camera(s) and sensor(s) 202 (e.g., in the IR spectrum) to construct a map of an unknown environment where an HMD is located, which simultaneously identifies where the HMD is located, its orientation, and/or pose.

Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100 and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible (RGB), IR, or NIR range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when video frame data (e.g., a video or depth-video stream) is received at host IHS 103 from gesture or RGB camera 108 of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video.

By analyzing positional change in the various skeletal joints and/or segments, certain corresponding movements that indicate predetermined gestures, actions, or behavior patterns of user 101 may be identified.

Examples of one and two-handed gestures that may be recognized or tracked by gesture recognition module 404 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

As used, herein, the term "minimize" or "minimizing" refers to the act of removing a window, object, application, or workspace from a main display area, collapsing it into an icon, caption, or placeholder. Conversely, the term "maximize" or "maximizing" refers to the act of displaying or expanding a window, object, application, or workspace to fill a main display area, for example, in response to user's selection of a corresponding icon, caption, or placeholder.

In other embodiments, the use of a virtual skeleton may not be necessary. For example, in other implementations, raw point-cloud data may be sent directly to a feature extraction routine within a gesture recognition module.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model displayed by HMD 102 from user 101's unique point-of-view based upon the user's coordinate location (e.g., from SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

In some cases, database 402 may also include a list of gesture candidates that can be recognized or tracked by GRT module 404. Each gesture candidate may include a set of parameters that, once identified in a given set of image frames, enable recognition of a presently performed gesture.

Video Encoding Acceleration

Most xR HMDs 102 are tethered, wired or wirelessly, to host IHS 103 (or a mobile platform) for compute purposes. In recent years, wirelessly tethered xR has started to gain increasing adoption, as well as investment in technology— yet wired connections between HMD 102 and IHS 103 are still widely in use today.

Architectures for tethered xR generally take the form of a server-client streaming architecture, with different transport layer mechanisms, such as Real-time Transport Protocol (RTP) over User Datagram Protocol (UDP)/Transmission Control Protocol (TCP), or the like. In various embodiments, IHS 103 is the server, which uses its own GPU (e.g., GPU 307 in FIG. 3) to render xR content using render engine 406, for example, to produce audio and 3D graphics with left (L) and right® views for display by the client, that is, HMD 102. As part of its rendering process, engine 406 may receive input from SLAM driver (e.g., SLAM module 403), which takes preprocessed SLAM IR camera frames from HMD 102 in order to render an updated world space camera view.

To preserve bandwidth, transmission of video content from IHS 103 to HMD 102 may involve a compression or encoding operation (of 3D, audio and other server data) by IHS 103, and then a corresponding decompression or decoding operation by HMD 102. In some cases, the encoding of 3D data may involve projecting 3D to 2D left and right eye views. A High Efficiency Video Coding (HEVC) or H.265 encoder, or an Advanced Video Coding (AVC) or H.264 encoder, may be used to produce 2D video frames; whereas audio may be encoded using Advanced Audio Coding (AAC), or the like. Unfortunately, video encoding routines can require computational power to maintain low latency operation, especially for intra-frame prediction and motion estimation processes.

To address these, and other problems, systems and methods described herein may reduce the complexity of, and/or increase the accuracy of, motion estimation (ME) (e.g., for inter or temporally predicted regions) and/or of intra prediction (e.g., for spatially predicted regions) processes which are part of encoding operations performed by IHS 103. Specifically, systems and methods described herein produce motion hints (e.g., candidate motion vectors) based upon data obtained from an HMD's SLAM subsystem, such as IMU data and/or IR/NIR image frames.

In some implementations, xR application 401 may operate as a software service on IHS 103 to generate a camera transform matrix from inside-Out SLAM output (e.g., captured by camera 108 on a per frame basis and processed by SLAM module 403). One or more camera transform matrices may be used to calculate a differential 3D motion matrix, to map the differential 3D motion matrix to 2D left and right eye motion matrices, and then to quantize these matrices to a selected motion vector range and quantization increments in order to produce motion hints (e.g., vectors/prediction difference per rendered pixel, etc.). Motion hints are usable by the encoder as fast start to motion estimation and/or intra prediction.

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

Figure 5:
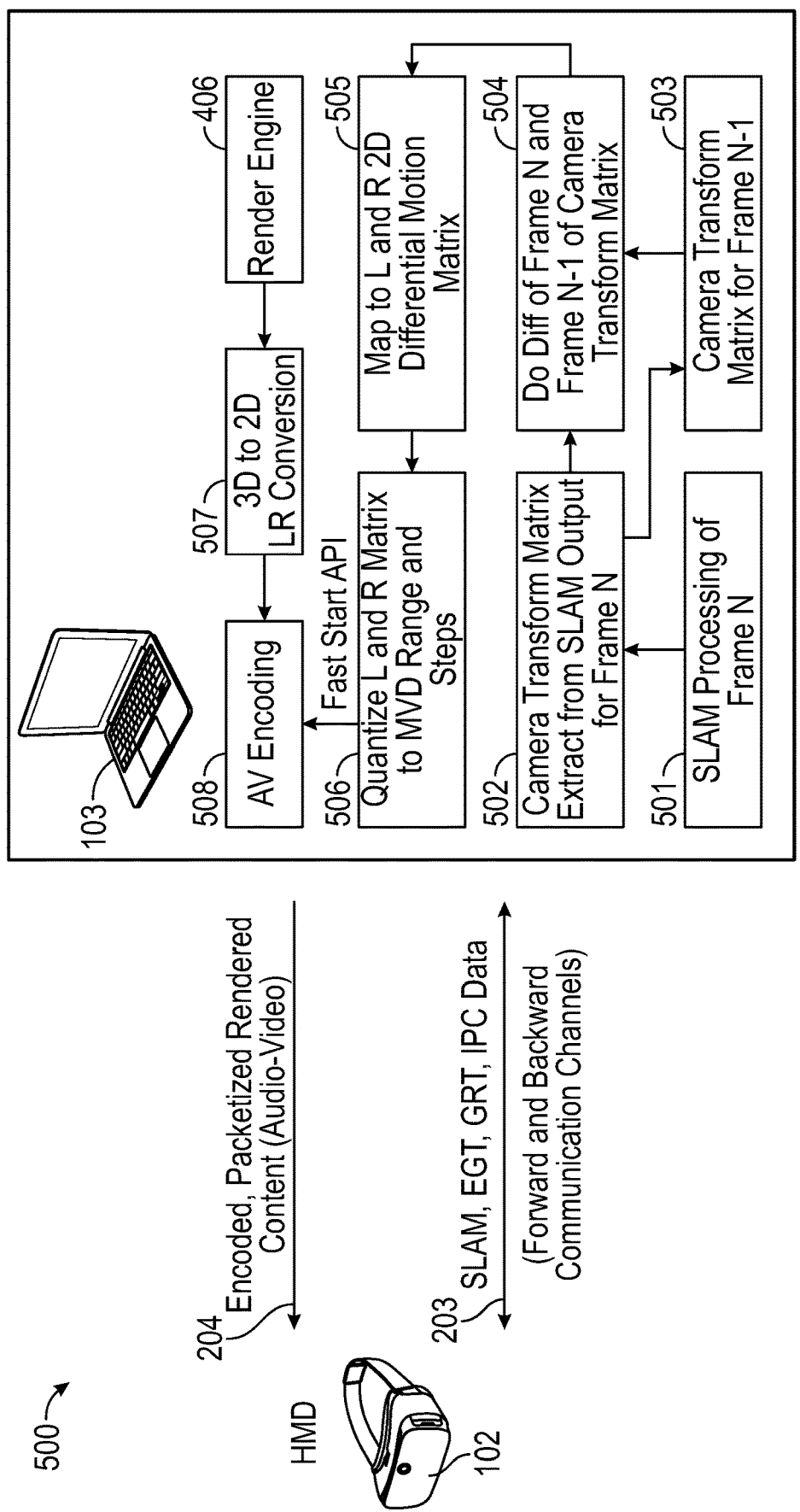
FIG. 5 illustrates an example of a method for video encoding acceleration in xR applications, according to some embodiments.

FIG. 5 illustrates an example of method 500 for accelerating video encoding in xR application 401 using SLAM data and/or frames. In some embodiments, method 500 may be performed by xR application 401 in cooperation with SLAM module 403 and rendering engine 406, under execution by IHS 103. Particularly, during execution of xR application 401, HMD 102 transmits SLAM sensor data, eye-gaze tracking (EGT) sensor data, gesture recognition and tracking (GRT) data, inter-process (IPC) communication data, etc. to IHS 103 via control interface 203. IHS 103 transmits encoded packetized rendered content (e.g., audio-video) to HMD 102 via video interface 204.

At block 501, method 500 includes the processing of SLAM sensor data (e.g., from an IMU, from an IR/NIR camera, or other sensor data that indicates 3D movement of HMD 102), such as a frame N, for example, by SLAM module 403. At block 502, method 500 extracts a first camera transform matrix from the SLAM sensor data associated with frame N (e.g., captured concurrently), whether such sensor data be IMU data and/or IR frame data itself. Block 503 buffers or stores a second camera transform matrix obtained from SLAM sensor data associated with a preceding frame, N−1, and block 504 takes a difference between the first camera transform matrix and the second camera transform matrix. The result of the subtraction in block 504 is referred to as a motion matrix.

At block 506, method 500 maps the motion matrix (in 3D) into a first 2D differential motion matrix (left or "L") and a second 2D differential motion matrix (right or "R"). Block 507 quantizes the L and R matrices into selected motion vector quantization ranges (e.g., +64 pixels to −64 pixels into +16 pixels to −16 pixels) and/or motion vector quantization increments (e.g., half-a-step, full-step, etc.) part of a motion vector format used by the rendering engine's Application Programming Interface (API) that enables and receives external motion hints. In various implementations, any suitable motion vector format may be used, as prescribed by applicable codec specification(s).

Meanwhile, render engine 406 produces video frames to be displayed by HMD 102 (in part, using SLAM data), block 507 performs 3D to 2D L-R conversion of the video frame. Block 508 performs AV encoding of the converted video frames, prior to providing packetized, compressed content to HMD 102 via video channel or interface 204.

Back to block 507, method 500 now provides at least a portion of the quantized L and/or R matrices as motion hints to encoding block 508 via the API. For example, motion hints may include one or more motion vectors usable by video encoder 509 as candidate motion vectors during a motion estimation (ME) process. Such candidate motion vectors can accelerate ME by reducing the number of operations performed an image search algorithm.

As such, embodiments described herein can leverage SLAM data for xR graphics encoding, which may be particularly useful in client-server xR architectures. In some implementations, blocks 501-507 may operate on the SLAM sensor data for every frame. Alternatively, method 500 may be computationally scaled in response to changes in resource usage, for example, by deriving motion hints based upon spatially down-sampled 3D output frames, at a lower frame rate (providing motion hints on every other frame, for example), based on predicted velocity/motion of user, and/or in response to virtual rendered content.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive sensor data from a Head-Mounted Device (HMD) wearable by a user during execution of a virtual, augmented, or mixed reality (xR) application, wherein the sensor data indicates movement of the HMD, and wherein the sensor data comprises a first frame of Simultaneous Localization And Mapping (SLAM) data captured by a SLAM camera mounted on the HMD and a second frame of SLAM data captured by the SLAM camera;
extract a first three-dimensional camera transform matrix from the first frame from the SLAM camera and extract a second three-dimensional camera transform matrix from the second frame from the SLAM camera, wherein the first camera transform matrix describes the position and orientation of the SLAM camera in the first frame and wherein the second camera transform matrix describes the position and orientation of the SLAM camera in the second frame;
generate a two-dimensional left-eye motion matrix and a two-dimensional right-eye motion matrix from differences between the first camera transform matrix and the second camera transform matrix;

generate a motion hint from the left-eye motion matrix and the right-eye motion matrix, wherein the motion hint comprises a candidate motion vector; and provide the motion hint to a video encoder, wherein the video encoder is configured to use the candidate motion vector to accelerate encoding of video transmitted by the IHS to the HMD during execution of the xR application.

2. The IHS of claim 1, wherein the motion hint comprises a difference measured in pixels of the rendered xR video.

3. The IHS of claim 2, wherein the first and second frames used to generate the candidate motion vector from the left-eye motion matrix and the right-eye motion matrix comprise infra-red (IR) or near IR (NIR) camera frames.

4. The IHS of claim 2, wherein to generate the candidate motion vector, the program instructions, in response to execution by the processor, further cause the IHS to:

calculate a three-dimensional motion matrix as a difference between the second and first camera transform matrices, wherein the left-eye motion matrix and the right-eye motion matrix are generated from the three-dimensional motion matrix.

5. The IHS of claim 1, wherein the sensor data comprises:

first sensor data obtained concurrently with the capture of a first frame by a SLAM camera mounted on the HMD; and second sensor data obtained concurrently with capture of a second frame by the SLAM camera following the first frame.

6. The IHS of claim 5, wherein the sensor data comprise at least one of: angular velocity data or accelerometer data, obtained from an Inertial Measurement Unit (IMU) mounted on the HMD.

7. The IHS of claim 1, wherein the first and second camera transform matrices represent movement of the SLAM camera distinct from the view of the user.

8. The IHS of claim 1, wherein the program instructions, in response to execution by the processor, further cause the IHS to quantize at least a portion of the left-eye motion matrix and the right-eye motion matrices into a motion vector format.

9. The IHS of claim 8, wherein the motion vector format further comprises a range of rendered pixels of the xR video and an increment in the encoding of the xR video.

10. The IHS of claim 8, wherein the program instructions, in response to execution by the processor, further cause the IHS to: provide at least a portion of the quantized portion of the motion matrix to the video encoder using an Application Programming Interface (API).

11. The IHS of claim 1, wherein the program instructions, in response to execution by the processor, further cause the IHS to: use the candidate motion vector during a motion estimation process of a video encoder used by the IHS in the encoding of the video transmitted to the HMD.

12. The IHS of claim 11, wherein the motion estimation process further comprises an inter-frame or intra-frame coding.

13. A method, comprising:

receiving, by an Information Handling System (IHS), a first Simultaneous Localization And Mapping (SLAM) frame and a second SLAM frame captured by a camera mounted on a Head-Mounted Device (HMD) worn by a user and wirelessly coupled to the IHS during execution of a virtual, augmented, or mixed reality (xR) application;

extracting a first three-dimensional camera transform matrix from the first SLAM frame from the camera and extract a second three-dimensional camera transform matrix from the second SLAM frame from the camera, wherein the first camera transform matrix describes the position and orientation of the SLAM camera in the first frame and wherein the second camera transform matrix describes the position and orientation of the SLAM camera in the second frame;

generating a two-dimensional left-eye motion matrix and a two-dimensional right-eye motion matrix from differences between the first camera transform matrix and the second camera transform matrix;

derive a motion hint from the left-eye motion matrix and the right-eye motion matrix, wherein the motion hint comprises a candidate motion vector; and provide the motion hint to a video encoder, wherein the video encoder is configured to use the candidate motion vector to accelerate encoding of video wirelessly transmitted by the IHS to the HMD during execution of the xR application.

14. The method of claim 13, wherein the SLAM image frames comprise infra-red (IR) or near IR (NIR) camera frames.

15. The method of claim 13, wherein deriving the candidate vector from the SLAM image frames further comprises:

calculating a three-dimensional motion matrix as a difference between the second and first camera transform matrices, wherein the left-eye motion matrix and the right-eye motion matrix are generated from the three-dimensional motion matrix.

16. The method of claim 13, wherein the first and second camera transform matrices represent movement of the SLAM camera distinct from the view of the user.

17. The method of claim 16, further comprising quantizing the motion matrix into a motion vector format.

18. The method of claim 17, further comprising providing at least a portion of the quantized motion matrix to the video encoder via an Application Programming Interface (API).

19. A hardware memory of a Head-Mounted Device (HMD) wearable by a user, the hardware memory having program instructions stored thereon that, upon execution by a processor, cause the HMD to:

transmit, to an Information Handling System (IHS), a first Simultaneous Localization And Mapping (SLAM) frame and a second SLAM frame captured by a camera mounted on the HMD, wherein the frames are usable by the IHS to perform Simultaneous Localization and Mapping (SLAM) of the HMD during execution of a virtual, augmented, or mixed reality (xR) application, wherein the IHS:

extracts a first three-dimensional camera transform matrix from the first SLAM frame from the camera and extract a second three-dimensional camera transform matrix from the second SLAM frame from the camera, wherein the first camera transform matrix describes the position and orientation of the SLAM camera in the first frame and wherein the second camera transform matrix describes the position and orientation of the SLAM camera in the second frame;

generates a two-dimensional left-eye motion matrix and a two-dimensional right-eye motion matrix from differences between the first camera transform matrix and the second camera transform matrix;

derives a motion hint from the left-eye motion matrix and the right-eye motion matrix; and receive video compressed by the IHS, at least in part, using the motion hint determined based upon the left-eye motion matrix and the right-eye motion matrix, wherein the motion hint comprises a candidate motion vector.

20. The HMD of claim 19, wherein the candidate motion vector is used during a motion estimation process of a video encoder used by the IHS in the encoding of the video transmitted to the HMD.

* * * * *